Feb. 23, 1965    R. M. VAUGHN    3,170,361
TOGGLE BOLT
Filed Aug. 6, 1962
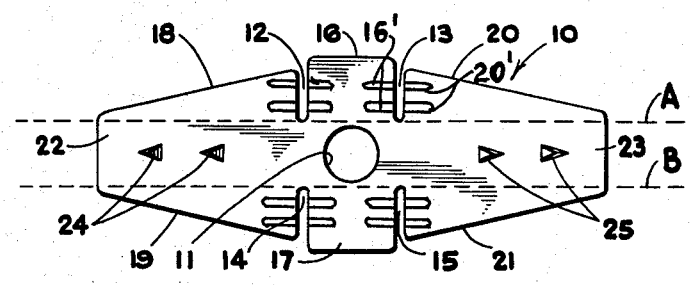
FIG. 1
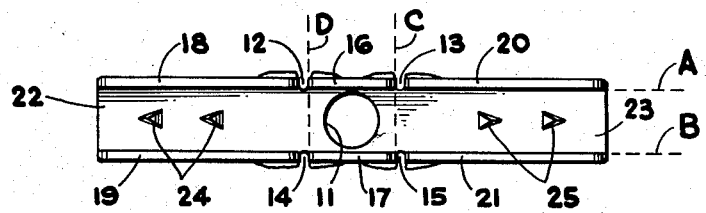
FIG. 2
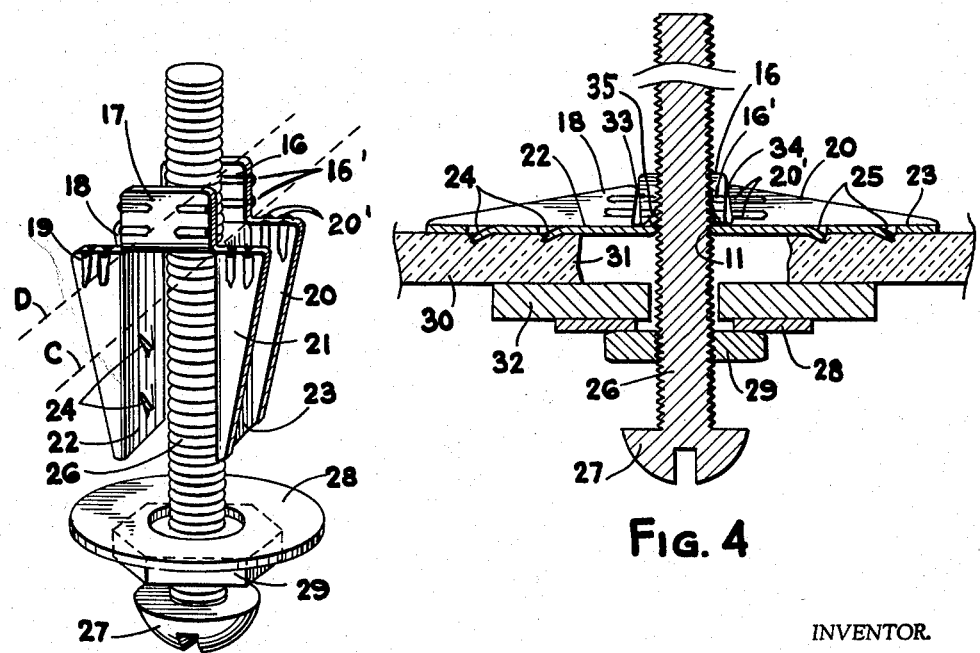
FIG. 3
FIG. 4
INVENTOR.
RUDOLPH M. VAUGHN
BY Elliott & Pastoriza
ATTORNEYS.

_United States Patent Office_ 3,170,361
Patented Feb. 23, 1965

3,170,361
TOGGLE BOLT
Rudolph M. Vaughn, 611 Lido Park Drive,
Newport Beach, Calif.
Filed Aug. 6, 1962, Ser. No. 215,075
2 Claims. (Cl. 85—3)

This invention relates generally to fastening devices and more particularly to an improved toggle bolt structure for use in plaster walls and the like.

Toggle bolts of the type under consideration are usually employed for securing fixtures to plaster walls. Generally, the plaster itself tends to crack and will not support screw threads. As a consequence, the only means for retaining an object against the wall is to provide a backing nut behind the plaster which will engage the peripheral portion of the hole in the plaster over a relatively large area. The plaster about the hole is thus sandwiched between the enlarged nut structure and the head of the bolt or screw as the case may be.

Toggle bolts presently available generally comprise a nut structure having arms movable with respect to each other so that they may be folded down to a collapsed position adjacent a screw for easy passing of the same through an opening. Expansion of the arms may be achieved by small hairpin type springs biasing the arms of the nut outwardly. In other types of toggle structures, an element is caused to rotate from a longitudinal or in-line position with a bolt to a transverse position by gravity after having been passed through an opening.

All of the various different types of nut structures as described above have required heretofore more than one element. Thus, there is usually necessary some type of intercoupling to provide a pivoting action and also a spring or equivalent biasing arrangement. Thus, three or more separate parts which must be assembled are usually required.

Also, in prior art structures, when the arms of the nut structure which are to move from a collapsed to an expanded position are pivoted, generally the entire load of the fastening device is carried by these pivots. Thus, there is not only the problem of relatively large expense in the manufacture and assembly of toggle bolts but in addition their strength is determined almost solely by the strength of small inter-coupled elements rather than the overall structure of the nut itself.

Another characteristic of present day toggle type fasteners is the requirement for a relatively large wall opening in order to pass the nut and screw structure into the plaster wall. Even when the nut structure is in its collapsed position, it still requires a relatively large opening.

In addition, if a present day type toggle bolt is removed, the nut portion will fall behind the wall. Therefore, a new nut must be provided before the bolt or screw can be replaced.

With all of the foregoing in mind, it is a primary object of this invention to provide a greatly improved toggle bolt in which the foregoing disadvantages are overcome.

More particularly, it is an object to provide a toggle bolt comprising a one-piece nut structure which may be formed by a single stamping operation to the end that a great economy is effected in the manufacture of the toggle bolt.

Another important object is to provide a single integral one piece nut structure in which auxiliary biasing means, springs, or pivoted type inter-coupled elements are avoided to the end that a simpler and more reliable structure results.

Another object is to provide an improved toggle bolt structure which does not require as large a wall opening as has been required by some prior art toggle bolts.

Still another important object is to provide an improved toggle bolt of relatively greater strength as a consequence of a more economical load distribution on the structural portions of the screw and nut structure.

Another object is to provide an improved toggle type nut which will not subsequently fall when the bolt or screw is removed so that a bolt may be removed and subsequently replaced in the same toggle nut.

Briefly, these and many other objects and advantages of this invention are attained by providing a toggle bolt including a nut structure formed of an integral flexible sheet of spring metal. This sheet is elongated in shape and is provided with a central opening which may be threaded to receive a screw. Also included are transverse slots defining central and longitudinal tabs or flanges bent upwardly to define a channel for lending strength to the structure. The cutting and bending of the metal can be effected by a single stamping operation. With this arrangement, and the slots now existing in the channel walls, the channel structure may be flexed about transverse fold lines passing through the slots on opposite sides of the central opening to define downwardly depending arms. These arms may be held in positions generally parallel to and on opposite sides of a screw received within the threaded opening.

The channel structure and screw may then be passed through an opening in a plaster wall with the arms held in flexed collapsed position. When the channel structure passes through the other side of the opening, the arms are free to spring out into alignment with each other. Tightening of the screw to bring the nut structure against the peripheral surface area of the opening results in the edges of the central and edge slots engaging each other to provide a solid backing.

In accordance with a feature of the invention, the floor of the channel structure defining the arms may be provided with barbs during the stamping operation so that after seating of the channel structure against the periphery of the opening by tightening of the nut, the channel structure will stay in position so that the screw may be unthreaded and removed and then subsequently replaced.

A better understanding of the invention will be had by now referring to a preferred embodiment thereof as illustrated in the accompanying drawings, in which:

FIGURE 1 is a plan view of an elongated piece of sheet metal partially formed in accordance with the invention to provide the nut portion of the toggle bolt;

FIGURE 2 is another plan view illustrating the sheet in FIGURE 1 after having been completely formed in accordance with the invention;

FIGURE 3 is a perspective view showing the complete toggle bolt assembly prior to passing the same through an opening in a wall; and, FIGURE 4 shows the toggle bolt of FIGURE 3 after the same has been passed through an opening and tightened to hold an object against a wall.

Referring first to FIGURE 1, there is shown an elongated integral resilient sheet 10 provided with a central opening 11 and opposite pairs of transverse slots 12, 13, and 14, 15. The pairs of slots define tabs 16 and 17. Also defined are pairs of longitudinal edge tabs on opposite sides of the central opening 11 as shown at 18, 19 and 20, 21. The tabs 16 and 17 and edge tabs 18, 19, and 20, 21 are provided with opposed beaded or ribbed portions at the slot edges such as indicated at 16' and 20' for the slot 13.

The single sheet of spring metal illustrated in FIGURE 1 may be formed with the slots 12, 13, 14, and 15, the various beaded portions, and the central opening 11 by a single stamping operation.

Referring to FIGURE 2, it will be noted that the central tabs 16 and 17 and longitudinal edge tabs 18, 19, 20, and 21 have all been bent upwardly through an angle of ninety degrees to form a general channel structure with elongated arm portions 22 and 23 defining the channel floors. The slots 12, 13, 14, and 15 thus appear as vertical cuts in the opposite channel walls on opposite sides of the central opening 11 as shown in FIGURE 2. The bending of the tabs can be effected simultaneously with the stamping of the single integral sheet member.

Referring now to FIGURE 3, there is shown a screw 26 threadedly received within the central opening 11. The oppositely extending arm portions of the channel structure have been flexed downwardly about the fold lines C and D so as to widen the vertical cuts through an angle of approximately ninety degrees. In other words, the edges of the central tabs 16 and 17 are disposed at right angles to the edges of the longitudinal tabs, the downwardly extending floor channel portions being substantially parallel to each other on opposite sides of the screw 26.

The screw 26 itself terminates in a head 27 and may be provided with an enlarged washer 28 and nut 29. The purpose for the washer and nut will become clearer as the description proceeds.

In operation, the arm portions 22 and 23 of the channel structure are resiliently flexed to the position illustrated in FIGURE 3 preparatory to passing the toggle structure through an opening in a wall. With reference, for example, to FIGURE 4 there is shown a plaster wall 30 provided with an enlarged opening 31. Assume it is desired to secure a member 32 to the wall 30. In this operation, the screw 26, free of the channel structure, will first be passed through the opening in the member 32 so that the member abuts against the washer 28 held by the nut 29 in any desired given position. The central opening 11 in the channel structure is then threaded on the end of the screw 26 and the arms of the channel collapsed as illustrated to FIGURE 3. The structure may then be passed through the opening 31 in the wall 30. The device is urged through the wall a sufficient distance to free the arms 22 and 23 so that they will flex back towards alignment with each other.

The lower ends of the arms will engage the flat opposite surface adjacent the peripheral area of the opening 31 so that threading of the screw 26 through the central opening 11 will tend to cause further expansion of the arms 22 and 23. This unbending of the arms will continue until the adjacent edges defining the slots 12 and 13 abut against each other as at 33 and 34 to provide a solid backing for the arms 22 and 23. The beaded portions such as 16' and 20' provide an increased opposing area to insure engagement of the adjacent edges.

In some instances, it may be desired to leave a portion of the screw head 27 projecting from the wall. In such case, the nut 29 itself can be used to cooperate with the washer 28 to provide a front seating or holding portion for the object 32. Also, by this arrangement, it is not necessary to thread the screw 26 up to its head but rather only the initial end of the screw need be received within the channel structure so that no end of the screw need project beyond the end of the channel structure when the nut and washer are employed to effect tightening of the assembly.

It will be evident with reference to FIGURE 4 that as the arms 22 and 23 are drawn into pressing engagement with the opposite peripheral surface area of the opening 31 in the wall, the barbs 24 will sink into the plaster so that the channel structure will be retained in place even if the screw 26 should be subsequently unthreaded and removed. Thus, other fixtures may be secured to the plaster wall by using the same toggle bolt structure without having to insert a new toggle nut portion.

From the foregoing description, it will be evident that the present invention has provided a greatly improved toggle bolt structure. Maximum strength of the available material is used as a consequence of the elimination of any inter-coupling or pivoted elements which heretofore have had to bear the load. Further, because of the unique design, the nut structure may be made in a single stamping operation so that great economy can be achieved in the manufacture of the toggle bolt. In this respect, the central opening 11 is formed by a piercing to provide area for a relatively long die thread length exceeding the original thickness of the sheet as illustrated in FIGURES 2 and 4 at 35. Thus, a large gripping area for the threads on the screw 26 is provided.

While only one particular embodiment of the invention has been shown and described, various changes that fall clearly within the scope and spirit of the invention will occur to those skilled in the art. Thus, while metal is preferred to enable a stamping operation to be carried out, it is possible to fabricate screws and/or nuts from plastic. The improved toggle bolt is therefore not to be thought of as limited to the exact embodiment set forth merely for illustrative purposes.

What is claimed is:

1. An improved toggle bolt comprising: a one-piece nut structure consisting of an elongated integral sheet of spring metal having a central threaded opening and including pairs of transverse slots extending inwardly adjacent to opposite sides of said opening to define opposed central tabs and pairs of longitudinal edge tabs for said sheet, said central and edge tabs being bent about first and second parallel fold lines in directions upwardly and towards each other to define a channel structure having substantially parallel sidewalls, said slots constituting vertical cuts in opposite channel walls, the floor portions of said channel structure between said pairs of longitudinal edge tabs on opposite sides of said central threaded opening being initially co-planar and adapted to be resiliently bent downwardly about transverse fold lines to define arms so that said slots are widened out to substantially ninety degree angles when said arms are held in a vertically downwardly extending position; and a screw received in said threaded opening so that said arms lie adjacent to opposite sides of said screw in parallel relationship thereto, whereby said channel structure and screw may be passed through an opening and said arms released so that they flex towards their original positions, subsequent tightening of said screw drawing said channel structure against the periphery of said opening to complete unbending of said arms to positions in which the edges of said tabs defining said vertical cuts engage each other to resist further unbending movement of said arms, the edges of the central and longitudinal tabs including opposing beaded portions to facilitate the engagement of said edges.

2. An improved toggle bolt according to claim 1, in which said floor portions of said channel structure include barb means for engaging the peripheral area of said opening when said screw is tightened so that said channel structure will be held against said opening in the absence of said screw, whereby said screw may be unthreaded and removed and subsequently rethreaded to said channel structure.

References Cited by the Examiner

UNITED STATES PATENTS

| | | | |
|---|---|---|---|
| 571,096 | 11/96 | Phillips | 85—3 |
| 1,049,376 | 1/13 | Le Manquais | 85—1 |
| 1,168,257 | 1/16 | Kennedy | 85—3 |
| 1,370,319 | 3/21 | Kennedy. | |
| 1,600,035 | 9/26 | Brenzier. | |

EDWARD C. ALLEN, *Primary Examiner.*